(12) United States Patent
Sasatani et al.

(10) Patent No.: US 10,638,115 B2
(45) Date of Patent: Apr. 28, 2020

(54) CALIBRATION DEVICE

(71) Applicant: HITACHI, LTD., Tokyo (JP)

(72) Inventors: So Sasatani, Tokyo (JP); Ryou Yumiba, Tokyo (JP); Masaya Itoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 223 days.

(21) Appl. No.: 15/513,842

(22) PCT Filed: Oct. 16, 2015

(86) PCT No.: PCT/JP2015/079250
§ 371 (c)(1),
(2) Date: Mar. 23, 2017

(87) PCT Pub. No.: WO2016/063796
PCT Pub. Date: Apr. 28, 2016

(65) Prior Publication Data
US 2017/0289526 A1    Oct. 5, 2017

(30) Foreign Application Priority Data

Oct. 24, 2014   (JP) .................................. 2014-216820

(51) Int. Cl.
*H04N 13/246*    (2018.01)
*G06K 9/00*    (2006.01)
(Continued)

(52) U.S. Cl.
CPC ....... *H04N 13/246* (2018.05); *G06K 9/00778* (2013.01); *G06K 9/4604* (2013.01);
(Continued)

(58) Field of Classification Search
CPC .... G06T 7/70; G06T 7/80; G06T 7/97; G06T 7/85
See application file for complete search history.

(56) References Cited

U.S. PATENT DOCUMENTS

2009/0021580 A1    1/2009  Ishigami et al.
2010/0232684 A1*   9/2010  Fujieda ..................... G06T 7/85
                                                        382/154
(Continued)

FOREIGN PATENT DOCUMENTS

JP    2006-067272 A    3/2006
JP    2009-135663 A    6/2009
(Continued)

OTHER PUBLICATIONS

Lv, Fengjun, Tao Zhao, and Ramakant Nevatia. "Camera calibration from video of a walking human." IEEE Transactions on Pattern Analysis & Machine Intelligence 9 (2006): 1513-1518. (Year: 2006).*

(Continued)

*Primary Examiner* — Clifford Hilaire
(74) *Attorney, Agent, or Firm* — Volpe and Koenig, P.C.

(57) ABSTRACT

In a calibration device, entry work of coordinate information on a real space is not required. An imaging system is configured to include an image acquisition unit which acquires an image from an imaging device, an object extraction unit which extracts a plurality of objects from the image, a characteristic information addition unit which adds geometry information that indicates geometric relationships among the plurality of objects to each set of objects as characteristic information, a camera parameter estimation unit which obtains image coordinates of the objects in accordance with the characteristic information to estimate camera parameters based on the characteristic information and the image coordinates, and a camera parameter output unit which outputs the camera parameters.

10 Claims, 14 Drawing Sheets

(51) Int. Cl.
*H04N 5/232* (2006.01)
*H04N 17/00* (2006.01)
*G06T 7/80* (2017.01)
*G06T 7/70* (2017.01)
*H04N 13/302* (2018.01)
*G06K 9/46* (2006.01)

(52) U.S. Cl.
CPC ............... *G06T 7/70* (2017.01); *G06T 7/80* (2017.01); *G06T 7/85* (2017.01); *H04N 5/23229* (2013.01); *H04N 13/302* (2018.05); *H04N 17/002* (2013.01)

(56) References Cited

U.S. PATENT DOCUMENTS

| | | |
|---|---|---|
| 2012/0269382 A1 | 10/2012 | Kiyohara et al. |
| 2013/0135474 A1 | 5/2013 | Sakano et al. |
| 2015/0029345 A1* | 1/2015 | Ikeda .................. H04N 17/002 348/187 |

FOREIGN PATENT DOCUMENTS

| | | |
|---|---|---|
| JP | 2009-266003 A | 11/2009 |
| JP | 2010-178312 A | 8/2010 |
| JP | 2010-256995 A | 11/2010 |
| JP | 2012-198031 A | 10/2012 |
| JP | 2013-115540 A | 6/2013 |
| WO | 2013/111229 A1 | 8/2013 |

OTHER PUBLICATIONS

Tsai R. A versatile camera calibration technique for high-accuracy 3D machine vision metrology using off-the-shelf TV cameras and lenses. IEEE Journal on Robotics and Automation. Aug. 1987;3(4):323-44. (Year: 1987).*

International Search Report for WO 2016/063796 A1, dated Jan. 19, 2016.

* cited by examiner

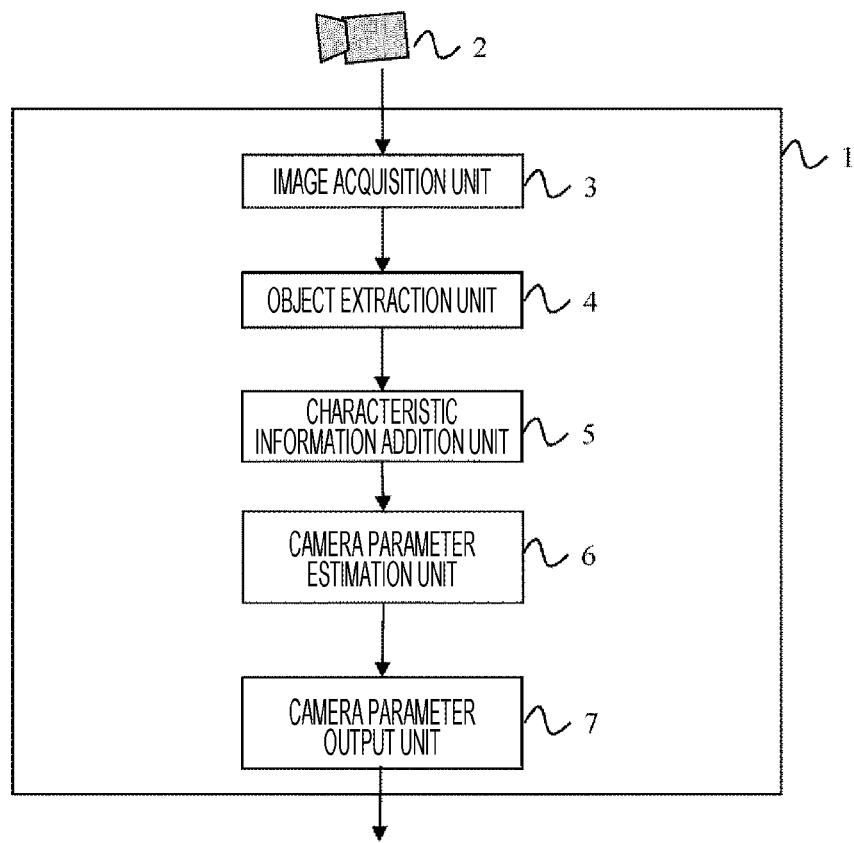
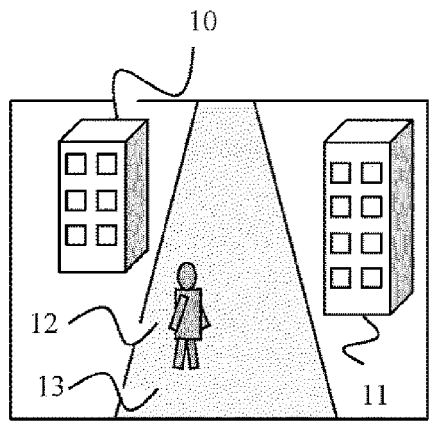

| $n$ | $P_n$ | $Q_n$ | $O_n$ |
|---|---|---|---|
| 1 | 10 | 12 | HORIZONTAL |
| 2 | 11 | 12 | VERTICAL |
| 3 | 13 | 12 | VERTICAL |

| $n$ | $P_n$ | $Q_n$ | $O_n$ |
|---|---|---|---|
| 1 | 14a | 15 | VERTICAL |
| 2 | 14b | 15 | VERTICAL |
| 3 | 14c | 15 | VERTICAL |
| 4 | 14d | 15 | VERTICAL |
| 5 | 14a | 14b | LEVEL |
| 6 | 14a | 14c | LEVEL |
| 7 | 14a | 14d | LEVEL |
| 8 | 14b | 14c | LEVEL |
| 9 | 14b | 14d | LEVEL |
| 10 | 14c | 14d | LEVEL |

FIG. 15
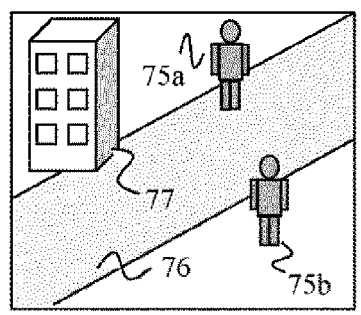
(a)
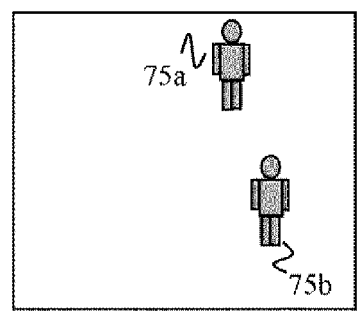
(b)
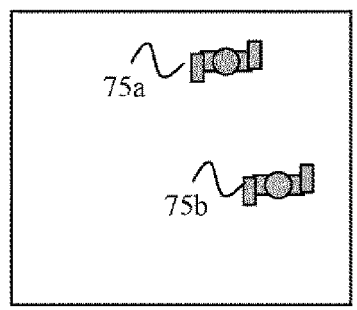
(c)
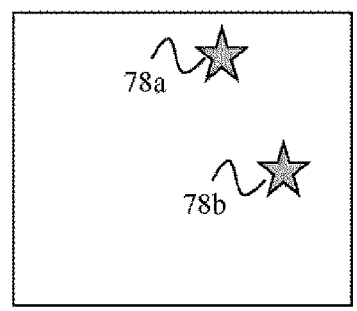
(d)

FIG. 16
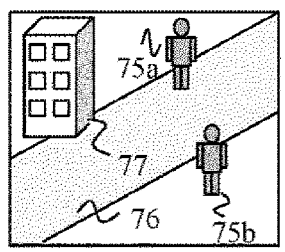
(a)
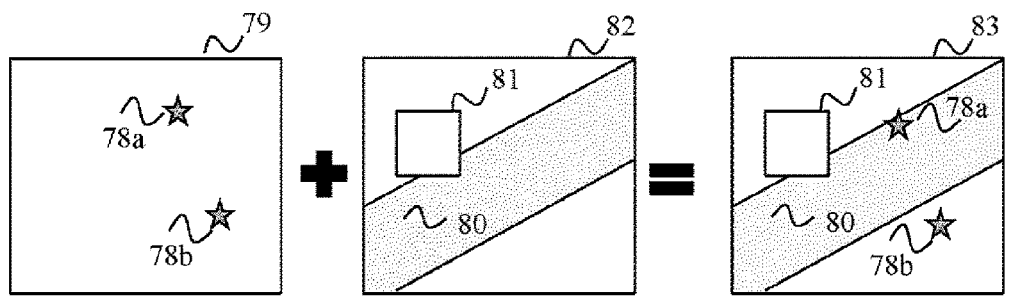
(b)
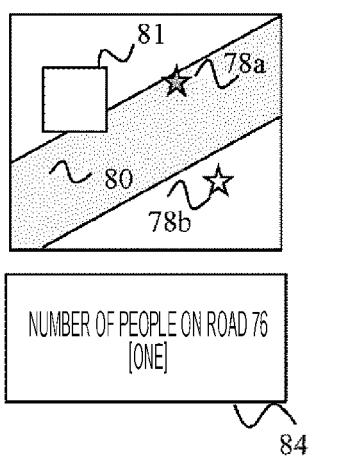
(c)
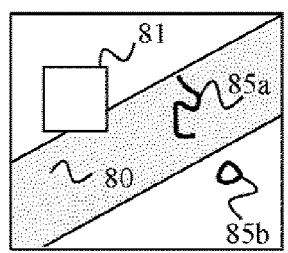
(d)
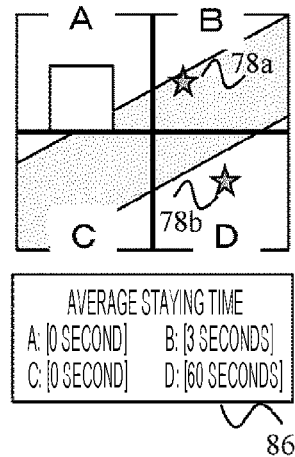
(e)

CALIBRATION DEVICE

TECHNICAL FIELD

The present invention relates to a calibration device and a calibration method for obtaining a camera parameter of a monitoring camera.

BACKGROUND ART

Recently, in a monitoring field, there is a growing need for an image recognition technique for detecting a position and a size of an object from an image photographed with an imaging device. In order to realize such an image recognition technique, it is necessary to make a coordinate set on an image photographed with a camera (hereinafter referred to as an "image coordinate") and a coordinate set on a real space (hereinafter referred to as a "world coordinate") correspond to each other. A camera parameter is used for this correspondence.

Camera parameters are camera information that indicates, for example, a focal length or a direction of a camera and can be classified roughly into two, internal parameters and external parameters. Math. 1 is an internal parameter matrix, with f, a, s, and ($v_c$, $u_c$) indicating a focal length, an aspect ratio, a skew, and a central coordinate of an image coordinate, respectively.

$$K = \begin{bmatrix} f & sf & v_c & 0 \\ 0 & af & u_c & 0 \\ 0 & 0 & 1 & 0 \end{bmatrix} \quad \text{[Math. 1]}$$

Math. 2 is an external parameter matrix, with ($r_{11}$, $r_{12}$, $r_{13}$, $r_{21}$, $r_{22}$, $r_{23}$, $r_{31}$, $r_{32}$, $r_{33}$) and ($t_x$, $t_y$, $t_z$) indicating directions of a camera and a world coordinate of a camera installation position, respectively.

$$D = \begin{bmatrix} r_{11} & r_{12} & r_{13} & t_X \\ r_{21} & r_{22} & r_{23} & t_Y \\ r_{31} & r_{32} & r_{33} & t_Z \\ 0 & 0 & 0 & 1 \end{bmatrix} \quad \text{[Math. 2]}$$

When these two parameter matrices K and D and a constant λ are used, an image coordinate (u, v) and a world coordinate ($X_W$, $Y_W$, $Z_W$) are made correspond to each other by a relational expression of Math. 3.

$$\lambda \begin{bmatrix} u \\ v \\ 1 \end{bmatrix} = KD \begin{bmatrix} X_w \\ Y_w \\ Z_w \\ 1 \end{bmatrix} \quad \text{[Math. 3]}$$

When defined by Euler angles, ($r_{11}$, $r_{12}$, … $r_{33}$) indicating the directions of a camera in the external parameters are expressed by three parameters, pan θ, tilt φ, and roll ψ that are installation angles of a camera. Therefore, the number of camera parameters necessary for correspondence between the image coordinate and the world coordinate is 11 derived by adding five internal parameters and six external parameters. In Math. 3, meanings of the camera parameter matrices remain unchanged even when multiplied by a constant.

Therefore, λ and the parameter matrices K and D may be arranged into one matrix and expressed as Math. 4. Additionally, in Math. 4, when $c_{34}$ is fixed at 1, the number of unknown parameters is 11. Obtaining these 11 parameters is synonymous with obtaining five internal parameters and six external parameters in Math. 3.

$$\begin{bmatrix} u \\ v \\ 1 \end{bmatrix} = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix} \begin{bmatrix} X_w \\ Y_w \\ Z_w \\ 1 \end{bmatrix} \quad \text{[Math. 4]}$$

Thus, Math. 3 can be eventually modified as Math. 5, and a matrix C in Math. 5 becomes a camera parameter obtained eventually. A calibration technique is needed to obtain this camera parameter C.

$$\begin{bmatrix} u \\ v \\ 1 \end{bmatrix} = C \begin{bmatrix} X_w \\ Y_w \\ Z_w \\ 1 \end{bmatrix} \left( C = \begin{bmatrix} c_{11} & c_{12} & c_{13} & c_{14} \\ c_{21} & c_{22} & c_{23} & c_{24} \\ c_{31} & c_{32} & c_{33} & 1 \end{bmatrix} \right) \quad \text{[Math. 5]}$$

In general calibration, a camera parameter C is calculated by photographing a specific object with a target camera to input a plurality of combinations of a world coordinate of a feature point and an image coordinate corresponding to the feature point in Math. 5. For example, in PTL 1, this coordinate information is acquired manually.

CITATION LIST

Patent Literature

PTL 1: JP 2006-067272 A

SUMMARY OF INVENTION

Technical Problem

In PTL 1, information necessary for calibration is input manually. Therefore, not only workloads are increased in installing a plurality of cameras, but also human errors caused by complicated work are easy to occur.

The present invention is an invention for solving the problem, and an object thereof, in calibration, is to carry out calibration without inputting coordinate information by extracting a plurality of objects from a camera image to add characteristic information to each object.

Solution to Problem

In order to achieve the object described above, a calibration device according to an embodiment of the present invention includes an image acquisition unit which acquires an image from an imaging device, an object extraction unit which extracts a plurality of objects from the image, a characteristic information addition unit which adds geometry information that indicates geometric relationships among the plurality of objects to each set of objects as characteristic information, a camera parameter estimation unit which obtains image coordinates of the objects in accordance with the characteristic information to estimate camera parameters based on the characteristic information and the image coordinates, and a camera parameter output unit which outputs the camera parameters.

Advantageous Effects of Invention

With the features described above, by applying a calibration device according to an embodiment of the present invention, calibration can be carried out without inputting coordinate information in a monitoring camera.

BRIEF DESCRIPTION OF DRAWINGS

FIG. 1 is a functional block diagram of a first embodiment of the present invention.

FIG. 2 is an example of buildings, a person, and a road extracted from a captured image in an object extraction unit.

FIGS. 15(a) to 15(d) are views describing a human position estimation unit.

FIGS. 16(a) to 16(e) are views describing a people flow analysis unit.

DESCRIPTION OF EMBODIMENTS

Figures 3, 4, 5:
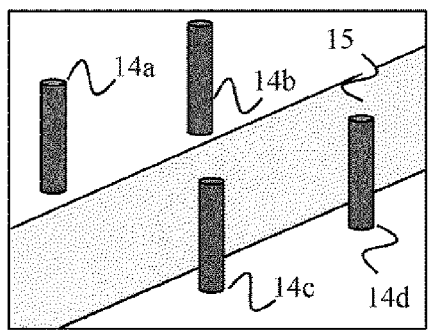
FIG. 3 illustrates, in case of FIG. 2, an example of characteristic information $O_n$ added by a characteristic information addition unit to objects $P_n$ and $Q_n$ extracted from a captured image by the object extraction unit.
FIG. 4 illustrates level objects and a road from a captured image.
FIG. 5 illustrates, in case of FIG. 4, an example of characteristic information $O_n$ added by a characteristic information addition unit to objects $P_n$ and $Q_n$ extracted from a captured image by an object extraction unit.

Specific embodiments of the present invention will be described below with reference to the drawings.

First Embodiment

FIG. 1 illustrates a block configuration diagram of a calibration device 1 in the present embodiment.

The calibration device 1 illustrated in FIG. 1 includes an image acquisition unit 3, an object extraction unit 4, a characteristic information addition unit 5, a camera parameter estimation unit 6, and a camera parameter output unit 7.

A calibration device may be installed in, for example, a management server via an imaging device 2 and a network, or in the imaging device 2.

The captured image acquisition unit 3 converts visible light obtained from at least one or more cameras 2 with a predetermined time period into electric signals via a CCD or a CMOS element. In a digital method, digital conversion is carried out in addition to this. An electric signal and a digitally converted image output from the image acquisition unit 3 are hereinafter referred to as a captured image.

The object extraction unit 4 extracts an object from a captured image. In the present embodiment, for example, a horizontal plane included in a captured image and an object standing upright on the horizontal plane are extracted. Included outdoors are a road as a horizontal plane, and a person or a building, for example, as an object standing upright on a horizontal plane. On the other hand, included indoors are a floor as a horizontal plane, and a desk or a shelf, for example, as an object standing upright on a horizontal plane.

Object extraction methods include manual extraction through a display screen such as a GUI and automatic extraction through image recognition. The former manual extraction through a GUI, for example, is carried out by directly specifying an outer frame of an object or by surrounding an object by a rectangle after a captured image is displayed on, for example, a display. The latter automatic extraction through image recognition is carried out by pre-acquiring a background image without an object to extract an object based on a difference between the background image and a captured image, or by extracting only an object with specific color information from a captured image. Another method is extracting and classifying a plurality of objects from an image through scene recognition to manually select a specific object from those objects. Object extraction methods other than the above are not subjected to any specific limitation as long as they are methods for extracting a specific object from a captured image.

The characteristic information addition unit 5 adds characteristic information to objects extracted in the object extraction unit 4. Characteristic information means geometry information that indicates geometric relationships established among a plurality of objects.

FIGS. 2 to 5 each illustrate an example of characteristic information $O_n$ added by the characteristic information addition unit 5 to objects $P_n$ and $Q_n$ extracted from a captured image by the object extraction unit 4.

FIG. 2 illustrates an example of objects 10 and 11, buildings, an object 12, a person, and an object 13, a road, extracted from a captured image in the object extraction unit 4. In a case where this type of captured image is acquired, characteristic information as in FIG. 3 is added.

In FIG. 3, n is a serial number imparted to characteristic information added to each set of objects, and $P_n$ and $Q_n$ indicate objects to which characteristic information is added. In the present embodiment, objects to which geometry information is added will be described in case of two objects $P_n$ and $Q_n$, but geometry information among two or more objects may be added. Characteristic information $O_n$ indicates geometry information between objects, and in the present embodiment, there are two pieces of characteristic information, "vertical" and "level". In FIG. 3, when n=1, geometry information $O_1$ of $P_1$=10 and $Q_1$=12 is horizontal. In other words, as illustrated in FIG. 2, both a building 10 and a person 12 stand vertically to a ground, and thus are geometrically in a horizontal relationship to each other.

FIG. 4 indicates from a captured image that objects 14a to 14d are level electric poles and an object 15 is a road.

In this case, characteristic information such as FIG. 5 can be added. It is only necessary that the number of characteristic information added by the characteristic information addition unit 5 be that of unknown parameters. For example, it is sufficient to just add only the characteristic information On of "vertical" to the objects 10 and 13 described in FIG. 3 in case of FIG. 2, and that of "level" to the objects 14a and 14b described in FIG. 5 in case of FIG. 4.

Here, means to add characteristics to objects include repeating a flow of selecting one piece of characteristic information from "vertical" and "level" after selecting two objects extracted from a captured image through, for example, the GUI such as a display screen, and adding in advance ID numbers to extracted objects and writing the numbers and characteristic information in, for example, a text file to make them correspond to each other.

Alternatively, for example, in case of FIG. 4, when the objects 14a to 14d are made correspond to one another with a characteristic of being "level", there is a method for automatically creating six combinations of objects to add characteristic information to each combination. Methods other than the above are not subjected to any specific limitation as long as they are methods for selecting a plurality of objects from among extracted objects in a captured image to make characteristic information correspond to those objects.

Figure 6:
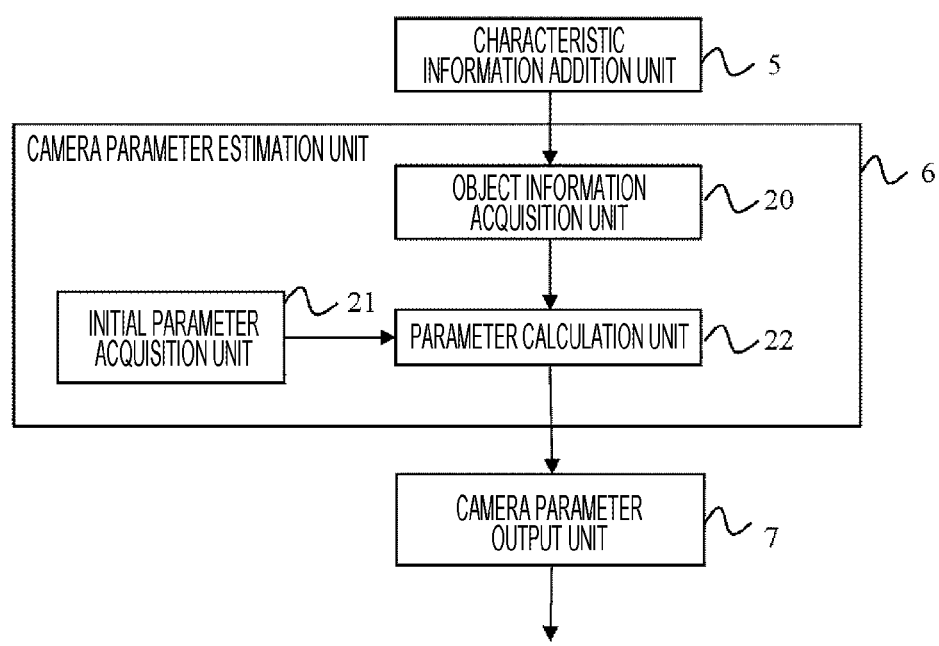
FIG. 6 is a diagram describing a flow of an object information acquisition unit.

FIG. 6 is a diagram illustrating details of the camera parameter estimation unit 6 illustrated in FIG. 1. The camera parameter estimation unit 6 estimates a camera parameter based on characteristic information of objects.

The camera parameter estimation unit 6 includes an object information acquisition unit 20, an initial parameter acquisition unit 21, and a parameter calculation unit 22.

The object information acquisition unit 20 inputs characteristic information output from the characteristic information addition unit 5 and obtains an image coordinate.

The initial parameter acquisition unit 21 acquires an initial value of a camera parameter. The parameter calculation unit 22 is a function of calculating a final camera parameter from an initial value of a camera parameter based on characteristic information added to objects and an image coordinate.

Figure 7:
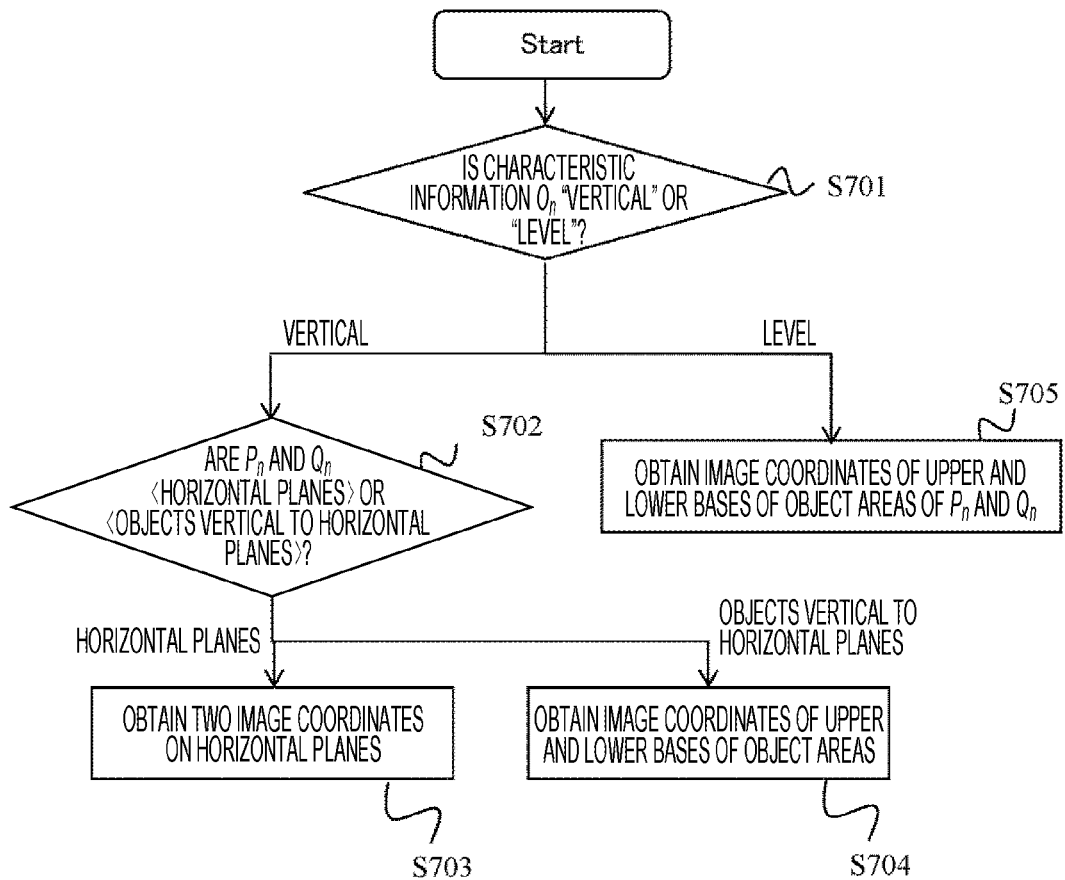
FIG. 7 illustrates a processing flow of an object information acquisition unit.

FIG. 7 illustrates a processing flow of the object information acquisition unit 20.

In the object information acquisition unit 20, it is firstly determined whether characteristic information $O_n$ added to the objects $P_n$ and $Q_n$ the characteristic information addition unit 5 is "vertical" or "level" (S701).

If the characteristic information $O_n$ is determined as "vertical" in S701, it is determined whether the objects $P_n$ and $Q_n$ are a <horizontal plane> or an <object vertical to a horizontal plane> (S702). If an object is a <horizontal plane>, two image coordinates are obtained from the horizontal plane (S703). Methods for obtaining two image coordinates from a horizontal plane include selecting randomly from a horizontal plane and selecting manually through the GUI, for example. On the other hand, if an object is an <object vertical to a horizontal plane>, image coordinates of upper and lower bases of the object area are obtained (S704). Instead of upper and lower bases of an object area, any two points on an axis in a height direction on a real space of an object area are acceptable. It is also acceptable to obtain two image coordinates on a y axis on a captured image of an object area of an object.

If the characteristic information $O_n$ is determined as "level" in S701, image coordinates of upper and lower bases in each area of the objects $P_n$ and $Q_n$ are obtained (S705). Instead of upper and lower bases of an object area, any two points on an axis in a height direction on a real space of an object area are acceptable. Methods for obtaining image coordinates of upper and lower bases of an object area include, when upper left of an image is set as an origin, setting a maximum y-coordinate of image coordinates of an outer frame of an object area as an upper base and a minimum y-coordinate thereof as a lower base, and setting a middle point of an upper side of an object area as an upper base and a middle point of a lower side thereof as a lower base. Methods for obtaining image coordinates other than the above are also acceptable as long as image coordinates can be selected. In this way, the object information acquisition unit 20 has a function of acquiring characteristic information added to objects and image information corresponding to the characteristic information.

Next, the initial parameter acquisition unit 21 will be described. The initial parameter acquisition unit 21 has a function of acquiring initial values of 11 camera parameters. Methods for acquiring initial parameters include acquisition by random numbers and manual input using hard information of a camera, and are not subjected to any specific limitation.

Lastly, the parameter calculation unit 22 will be described. The parameter calculation unit 22 calculates final camera parameters based on the characteristic information $O_n$ of the objects $P_n$ and $Q_n$ acquired by the object information acquisition unit 20, image coordinates $(px_n, py_n)$ and $(px_{n'}, py_{n'})$ of the object $P_n$ and image coordinates $(qx_n, qy_n)$ and $(qx_{n'}, qy_{n'})$ of the object $Q_n$, and an initial camera parameter $C_0$ input by the initial parameter acquisition unit 21.

A camera parameter C dealt with by the parameter calculation unit 22 will be described. In Math. 5 described above, when a world coordinate $Z_w$ is set at a fixed value H, the formula can be modified as Math. 7 through Math. 6. Math. 7 indicates that world coordinates $X_w$ and $Y_w$ can be derived from an image coordinate (u, v) and the camera parameter C, when the world coordinate $Z_w$ is known as H.

$$\begin{bmatrix} u \\ v \\ 1 \end{bmatrix} = \begin{bmatrix} c_{11} & c_{12} & c_{13} & c_{14} \\ c_{21} & c_{22} & c_{23} & c_{24} \\ c_{31} & c_{32} & c_{33} & 1 \end{bmatrix} \begin{bmatrix} X_w \\ Y_w \\ H \\ 1 \end{bmatrix} \quad \text{[Math. 6]}$$

$$\begin{bmatrix} u \\ v \\ 1 \end{bmatrix} = \begin{bmatrix} c_{11} & c_{12} & c_{14} \\ c_{21} & c_{22} & c_{24} \\ c_{31} & c_{32} & 1 \end{bmatrix} \begin{bmatrix} X_w \\ Y_w \\ 1 \end{bmatrix} + H \begin{bmatrix} c_{13} \\ c_{23} \\ c_{33} \end{bmatrix}$$

$$\begin{bmatrix} u \\ v \\ 1 \end{bmatrix} - H \begin{bmatrix} c_{13} \\ c_{23} \\ c_{33} \end{bmatrix} = \begin{bmatrix} c_{11} & c_{12} & c_{14} \\ c_{21} & c_{22} & c_{24} \\ c_{31} & c_{32} & 1 \end{bmatrix} \begin{bmatrix} X_w \\ Y_w \\ 1 \end{bmatrix}$$

$$\begin{bmatrix} c_{11} & c_{12} & c_{14} \\ c_{21} & c_{22} & c_{24} \\ c_{31} & c_{32} & 1 \end{bmatrix}^{-1} \left( \begin{bmatrix} u \\ v \\ 1 \end{bmatrix} - H \begin{bmatrix} c_{13} \\ c_{23} \\ c_{33} \end{bmatrix} \right) = \begin{bmatrix} X_w \\ Y_w \\ 1 \end{bmatrix} \quad \text{[Math. 7]}$$

Here, when Math. 7 is developed as Math. 8 and a condition $C_{31} \cdot C_{13} + C_{32} \cdot C_{23} + C_{34} \cdot C_{33} \neq 0$ is added, the fixed value H can be rewritten as in Math. 9.

$$\begin{bmatrix} c'_{11} & c'_{12} & c'_{14} \\ c'_{21} & c'_{22} & c'_{24} \\ c'_{31} & c'_{32} & c'_{34} \end{bmatrix} \left( \begin{bmatrix} u \\ v \\ 1 \end{bmatrix} - H \begin{bmatrix} c_{13} \\ c_{23} \\ c_{33} \end{bmatrix} \right) = \begin{bmatrix} X_w \\ Y_w \\ 1 \end{bmatrix} \quad \text{[Math. 8]}$$

$$\left( \begin{bmatrix} c_{11} & c_{12} & c_{14} \\ c_{21} & c_{22} & c_{24} \\ c_{31} & c_{32} & 1 \end{bmatrix}^{-1} = \begin{bmatrix} c'_{11} & c'_{12} & c'_{14} \\ c'_{21} & c'_{22} & c'_{24} \\ c'_{31} & c'_{32} & c'_{34} \end{bmatrix} \right)$$

$$\begin{bmatrix} c'_{11}u + c'_{12}v + c'_{14} - H(c'_{11}c_{13} + c'_{12}c_{23} + c'_{14}c_{33}) \\ c'_{21}u + c'_{22}v + c'_{24} - H(c'_{21}c_{13} + c'_{22}c_{23} + c'_{24}c_{33}) \\ c'_{31}u + c'_{32}v + c'_{34} - H(c'_{31}c_{13} + c'_{32}c_{23} + c'_{34}c_{33}) \end{bmatrix} = \begin{bmatrix} X_w \\ Y_w \\ 1 \end{bmatrix}$$

$$H = \frac{c'_{31}u + c'_{32}v + c'_{34} - 1}{(c'_{31}c_{13} + c'_{32}c_{23} + c'_{34}c_{33})}(c'_{31}c_{13} + c'_{32}c_{23} + c'_{34}c_{33} \neq 0) \quad \text{[Math. 9]}$$

Thus, even when the value H is not known in Math. 7, a world coordinate $w_i$ can be calculated from the image coordinate (u, v) and the camera parameter C, and in the present embodiment, this relational expression is represented as in Math. 10 using a function f. In the parameter calculation unit 22, a camera parameter is estimated by Math. 10.

$$w_i = f(u_i, v_i, h, C)$$

$$[w_i = (X_{wi}, Y_{wi}, h)] \quad \text{[Math. 10]}$$

Figure 8:
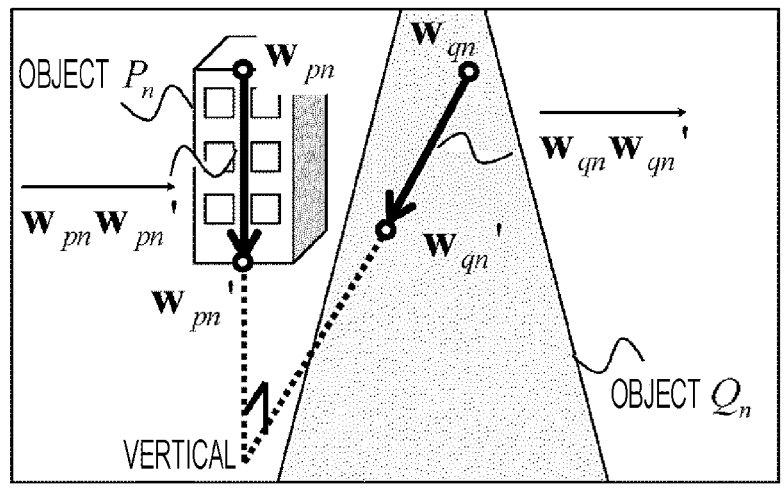
FIG. 8 is an exemplary space vector between objects whose characteristic information is "vertical".

Methods for estimating a camera parameter will be described below in an example where the characteristic information $O_n$ is "vertical". FIG. 8 illustrates a captured image in this example. In a case where the object $P_n$ is assumed to be an object vertical to a horizontal plane and at a height of H while the object $Q_n$ is assumed to be a horizontal plane, a world coordinate $w_{pn}$ corresponding to an image coordinate $(px_n, py_n)$ of an upper base portion of the object $P_n$ and a world coordinate $w_{pn'}$ corresponding to an image coordinate $(px_{n'}, py_{n'})$ of a lower base portion thereof are represented as in Math. 11.

$$w_{pn} = f(px_n, py_n, H, C_0)$$

$$w_{pn'} = f(px_{n'}, py_{n'}, 0, C_0) \quad \text{[Math. 11]}$$

On the other hand, an image coordinate of the object $Q_n$ exists on a horizontal plane. Therefore, world coordinates thereof $w_{qn}$ and $w_{qn'}$ are represented as in Math. 12.

$$w_{qn} = f(qx_n, qy_n, 0, C_0)$$

$$w_{qn'} = f(qx_{n'}, qy_{n'}, 0, C_0) \quad \text{[Math. 12]}$$

Here, as illustrated in FIG. 8, the objects $P_n$ and $Q_n$ are vertical, and thus an inner product of $w_{pn}w_{pn'}$ and $w_{qn}w_{qn'}$ of a space vector becomes zero as in Math. 13.

$$\overrightarrow{w_{pn}w_{pn'}} \cdot \overrightarrow{w_{qn}w_{qn'}} = (w_{pn} - w_{pn'}) \cdot (w_{qn} - w_{qn'}) = 0 \quad \text{[Math. 13]}$$

Then, a final camera parameter C can be derived by optimizing the initial camera parameter $C_0$ such that an error function E indicated in Math. 14 is at a minimum.

$$E(C_0) = \min \sum_i \sum_j ((w_{pi} - w'_{pi}) \cdot (w_{qj} - w'_{qj})) \quad \text{[Math. 14]}$$

Figure 9:
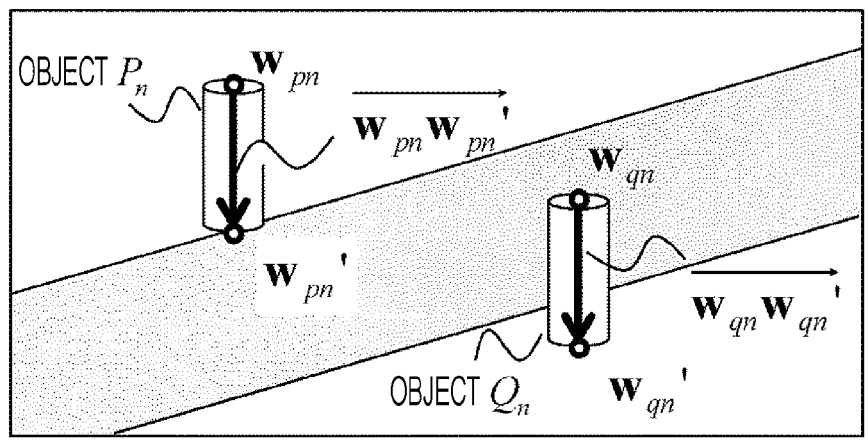
FIG. 9 is an exemplary space vector between objects whose characteristic information is "level".

As an optimization method, a general method such as bundle adjustment is used, and there is no specific limitation. Next, an estimation method when the characteristic information $O_n$ is "level" will be described. FIG. 9 illustrates a captured image in this example. Assuming that the objects $P_n$ and $Q_n$ are at a height of H and stand upright on horizontal planes, the world coordinates $w_{pn}$, $w_{pn'}$, $w_{qn}$, $w_{qn'}$ corresponding to image coordinates $(px_n, py_n)$ and $(px_{n'}, py_{n'})$ of the upper and lower base portions of the object $P_n$ and image coordinates $(qx_n, qy_n)$ and $(qx_{n'}, qy_{n'})$ of the upper and lower base portions of the object $Q_n$ at a height of H are represented as in Math. 15.

$$w_{pn} = f(px_n, py_n, H, C_0)$$

$$w_{pn'} = f(px_{n'}, py_{n'}, 0, C_0)$$

$$w_{qn} = f(qx_n, qy_n, H, C_0)$$

$$w_{qn'} = f(qx_{n'}, qy_{n'}, 0, C_0) \quad \text{[Math. 15]}$$

Here, as illustrated in FIG. 9, the objects $P_n$ and $Q_n$ are level, and thus a difference in magnitude between space vectors $w_{pn}w_{pn'}$ and $w_{qn}w_{qn'}$ is zero as in Math. 16.

$$|\overrightarrow{w_{pn}w_{pn'}}| - |\overrightarrow{w_{qn}w_{qn'}}| = |w_{pn} - w_{pn'}| - |w_{qn} - w_{qn'}| = 0 \quad \text{[Math. 16]}$$

Thus, the camera parameter C can be estimated by optimizing the initial parameter $C_0$ such that the error function E indicated in Math. 17 is at a minimum.

$$E(C_0) = \min \sum_i \sum_j (|w_{pi} - w'_{pi}| - |w_{qj} - w'_{qj}|) \quad \text{[Math. 17]}$$

In optimization using Maths. 14 and 17, only one camera parameter can be estimated from only one set of vector information. However, it is obvious that a plurality of camera parameters can be simultaneously estimated by increasing characteristic information. For example, in a case where characteristic information is "vertical", constraints can be increased by extracting two or more image coordinates from object areas on a horizontal plane to acquire a plurality of space vectors. In a case where characteristic information is "level", constraints can be increased by increasing space vector information by selecting more level objects from an image. It is also possible to reduce constraints to estimate a camera parameter by setting a known camera parameter from, for example, hard information of a camera at the initial parameter $C_0$ as a fixed value. In the present embodiment, only "vertical" and "level" in characteristic information of objects have been described, but Characteristic information such as "parallel" and "angled at 45° between objects" may be used.

Referring back to FIG. 1, the camera parameter output unit 7 outputs a camera parameter estimated in the camera parameter estimation unit 6 to, for example, the imaging device 2 or the management server to set a camera parameter for the imaging device 2.

As described above, in the present embodiment, using a plurality of objects extracted from a camera image and characteristic information added thereto allows calibration without inputting coordinate information on a real space.

In the first embodiment, after the final camera parameter is obtained from characteristic information between some objects, a value of a parameter may be updated using characteristic information between objects different from previous ones, with the final camera parameter set as an initial parameter.

Second Embodiment

The present embodiment relates to a case where accuracy of the camera parameter derived in the first embodiment is adjusted.

Figure 10:
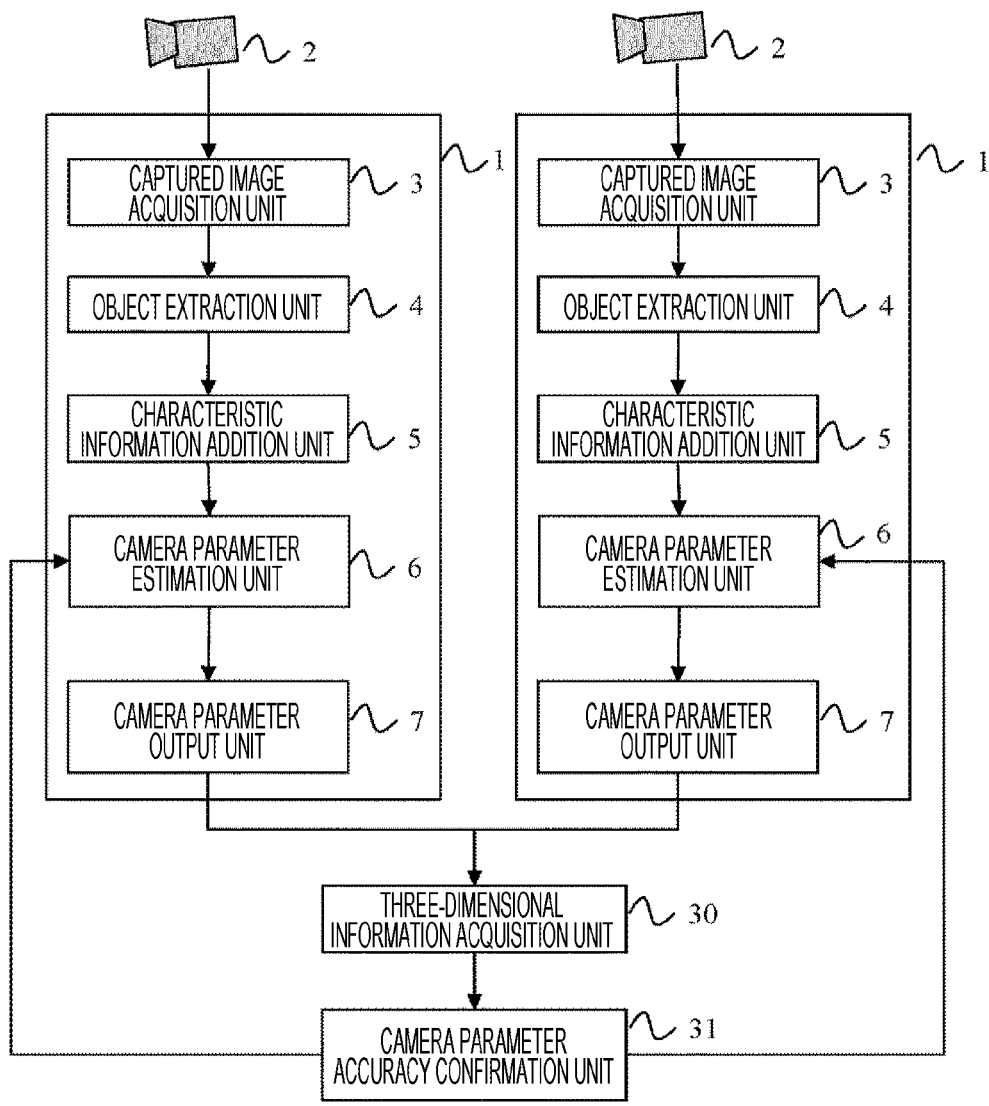
FIG. 10 is a functional block diagram of a second embodiment of the present invention.

A functional block diagram of the second embodiment will be illustrated in FIG. 10. In FIG. 10, functions of 1 to 7 are identical to those in the first embodiment.

To outline FIG. 10, firstly, in a plurality of cameras 2 (imaging devices 2), a camera parameter of each camera 2 is estimated by the functions 3 to 7. Next, a three-dimensional information acquisition unit 30 acquires, from captured images of the two cameras and camera parameters obtained from camera parameter output units 7, three-dimensional information of an object in the images.

Then, a camera parameter accuracy confirmation unit 31 confirms accuracies of the camera parameters from the three-dimensional information of the object acquired by the three-dimensional information acquisition unit 30, and re-estimates the camera parameters when the accuracies thereof are poor. Such a configuration makes it possible to acquire highly accurate camera parameters.

Functions of the three-dimensional information acquisition unit 30 and the camera parameter accuracy confirmation unit 31 will be described below.

The three-dimensional information acquisition unit 30 acquires three-dimensional information of the object by calculating a distance between the object in the captured images and the cameras from the captured images acquired with the two cameras and the camera parameter estimated at each camera. Used as a method for acquiring three-dimensional information is a general method called stereo matching for calculating disparity by a basic matrix F derived from camera parameters. The basic matrix F is a parameter matrix that indicates a relative positional relationship between two cameras, and can be calculated, as indicated in Math. 18, from internal parameters $K_0$ and $K_1$ and external parameters $D_0$ and $D_1$ of the two cameras acquired by the camera parameter output units 7.

$$F = (K_0^{-1})^T T R K_1^{-1}$$ [Math. 18]

$$R = R_0 R_1^{-1}$$

$$T = \begin{bmatrix} 0 & -t_3 & t_2 \\ t_3 & 0 & -t_1 \\ -t_2 & t_1 & 0 \end{bmatrix}$$

$$\left( D_1 = \begin{bmatrix} r_{11} & r_{12} & r_{13} & t_X \\ r_{21} & r_{22} & r_{23} & t_Y \\ r_{31} & r_{32} & r_{33} & t_Z \\ 0 & 0 & 0 & 1 \end{bmatrix} = \begin{bmatrix} R_i & | & T_i \\ 0 \ 0 \ 0 & | & 1 \end{bmatrix} \right.$$

$$\left. R_0(T_1 - T_0) = \begin{bmatrix} t_1 \\ t_2 \\ t_3 \end{bmatrix} \right)$$

Figure 11:
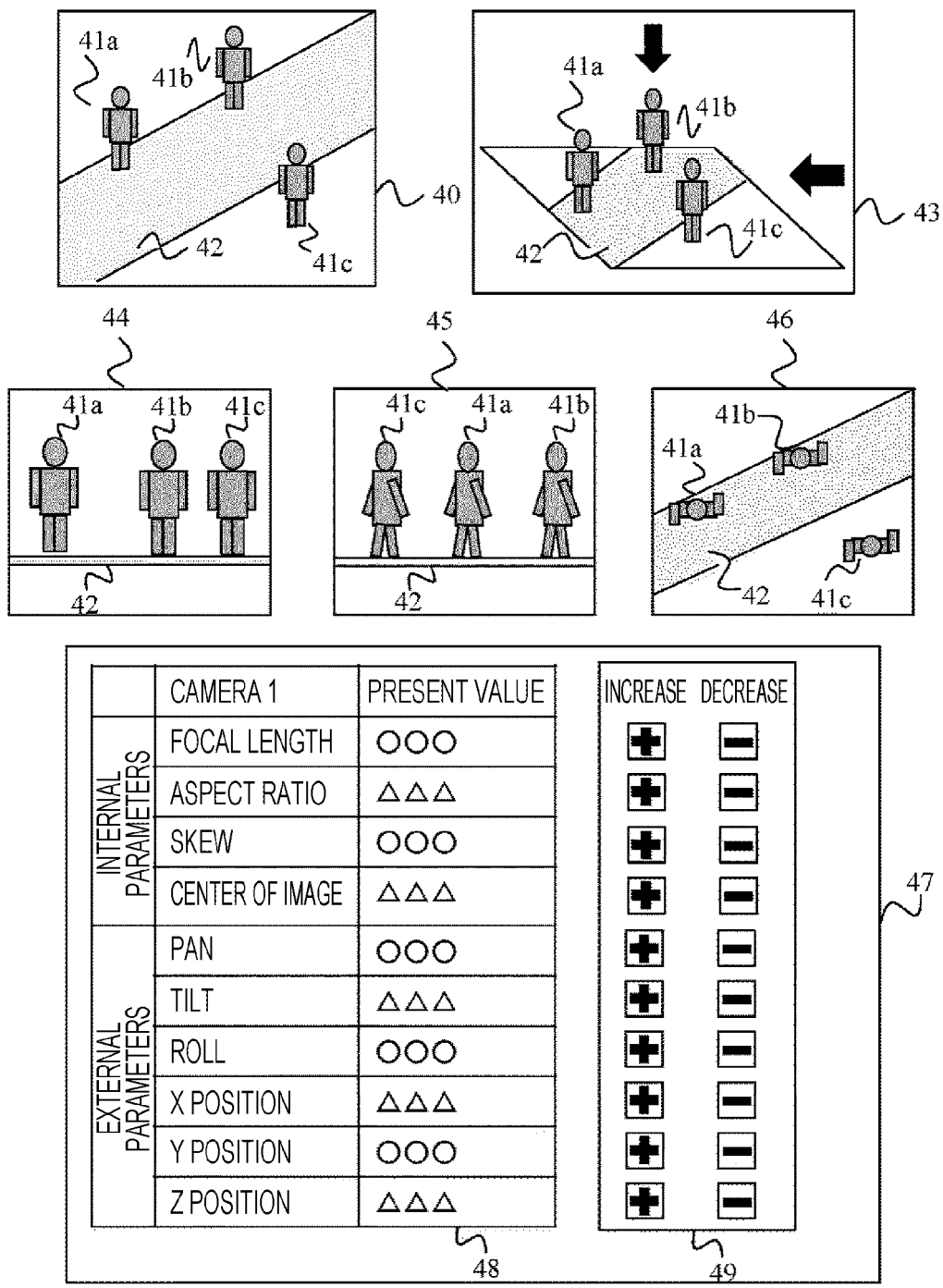
FIG. 11 is a view describing a camera parameter accuracy confirmation unit.

FIG. 11 is an exemplary GUI screen where a user adjusts, in the camera parameter accuracy confirmation unit 31, values of parameters while confirming accuracies of the camera parameters by looking at viewpoint-converted images created from three-dimensional information.

In FIG. 11, a screen 40 is a captured image of the camera 2, and humans 41a to 41c having an identical height and a road 42 are photographed. A screen 43 displays three-dimensional information of the humans 41a to 41c and the road 42, while screens 44 to 46 are viewpoint-converted images when the three-dimensional information displayed on the screen 43 is viewed from a virtual perspective. The screens 44 to 46 display viewpoint-converted images viewed from the front, side (right), and directly above, respectively.

As a method for creating a viewpoint-converted image, a general method such as perspective projection using a camera parameter is used. Viewpoint-converted images created from viewpoint directions other than the front, side (right), and directly above may be used.

In the camera parameter accuracy confirmation unit 31, accuracies of camera parameters are confirmed with these viewpoint-converted images 44 to 46. In a case where the camera parameters are calculated accurately, as illustrated in FIG. 11, the road 42 is horizontal and the humans 41a to 41c stand upright on the road 42 with tops of heads thereof level in the viewpoint-converted images 44 and 45, and the humans 41a to 41c are positioned distantly and thus each human area is independent in the viewpoint-converted image 46.

However, for example, of external parameters of a camera, when there is an error in tilt angle that indicates a depression angle of a camera, the road 42 is not horizontal and the humans 41a to 41c are not level in top of head in the viewpoint-converted images 44 and 45. Therefore, a user can confirm an error in tilt angle by confirming a display screen. Thus, camera parameters with errors are adjusted through a camera parameter adjustment GUI 47 in FIG. 11. At the camera parameter adjustment GUI 47, camera parameters of a camera that outputs a captured image 40, displayed on the screen 48, can be adjusted with increase/decrease buttons 49. At the GUI 47, when parameter values are adjusted with the increase/decrease buttons 49, the viewpoint-converted images 44 to 46 are updated in accordance with the values. Therefore, a user can visually correct camera parameters. Camera parameters changed by a user may be input again in the camera parameter estimation unit 6 as initial values or fixed values to optimize, or may be used directly. A camera whose parameters are adjusted through a camera parameter adjustment GUI can be selected, and once a camera for the adjustments is changed, the captured image 40 and the viewpoint-converted images 44 to 46 are updated to images corresponding to the changed camera. As a parameter adjustment means, besides the use of the increase/decrease buttons 49 as illustrated in FIG. 11, direct input of values is acceptable, and there is no specific limitation.

In the second embodiment of the present invention, with the functional configuration described above, by generating viewpoint-converted images from camera parameters obtained from two cameras and three-dimensional information of objects to display on the GUI, a user can, while visually confirming accuracies of the camera parameters of the two cameras, adjust the values of the parameters when necessary.

In the second embodiment, the number of cameras may not be limited to two, and the values of parameters may be adjusted while accuracies of camera parameters of a plurality of cameras are simultaneously confirmed.

Third Embodiment

In the present embodiment, a case will be described where Characteristic information is added based on a geometric relationship between objects existing on two or more captured images acquired at different times, instead of characteristic information added based on geometric relationships among two or more objects existing on one captured image in the first embodiment.

Figure 12:
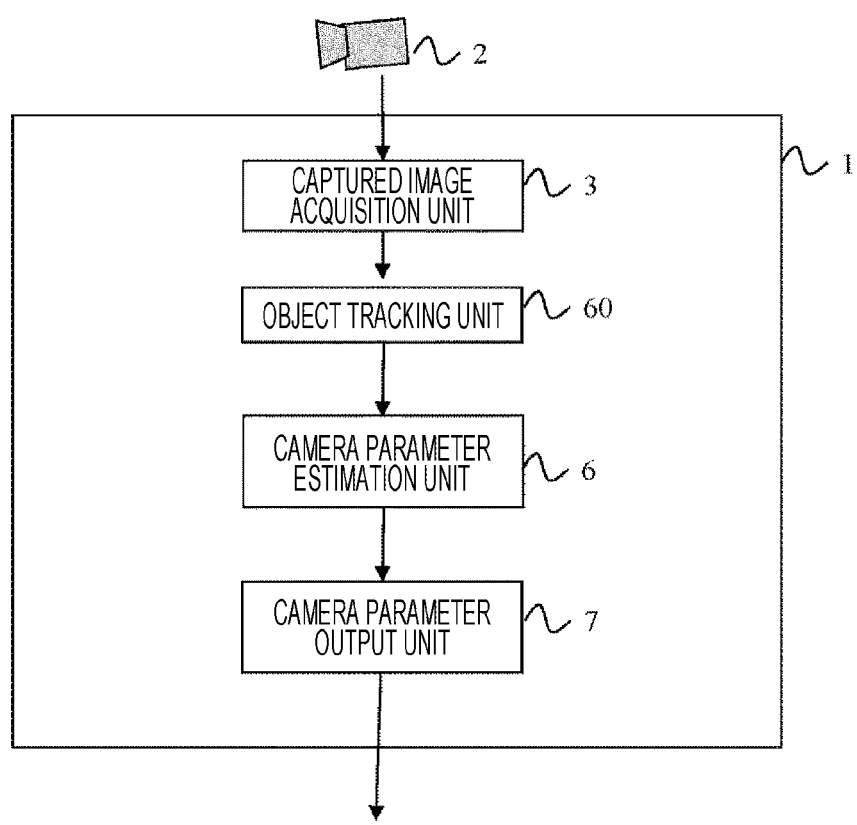
FIG. 12 is a functional block diagram of a third embodiment of the present invention.

FIG. 12 illustrates a functional block diagram of the third embodiment.

In FIG. 12, functions of 1, 2, 3, 6, and 7 are identical to those in the first embodiment. An object tracking unit 60 is a function of acquiring characteristic information of objects and image information from a plurality of captured images by tracking a human, or a moving object. Details of the function of the object tracking unit 60 will be described below.

Figure 13:
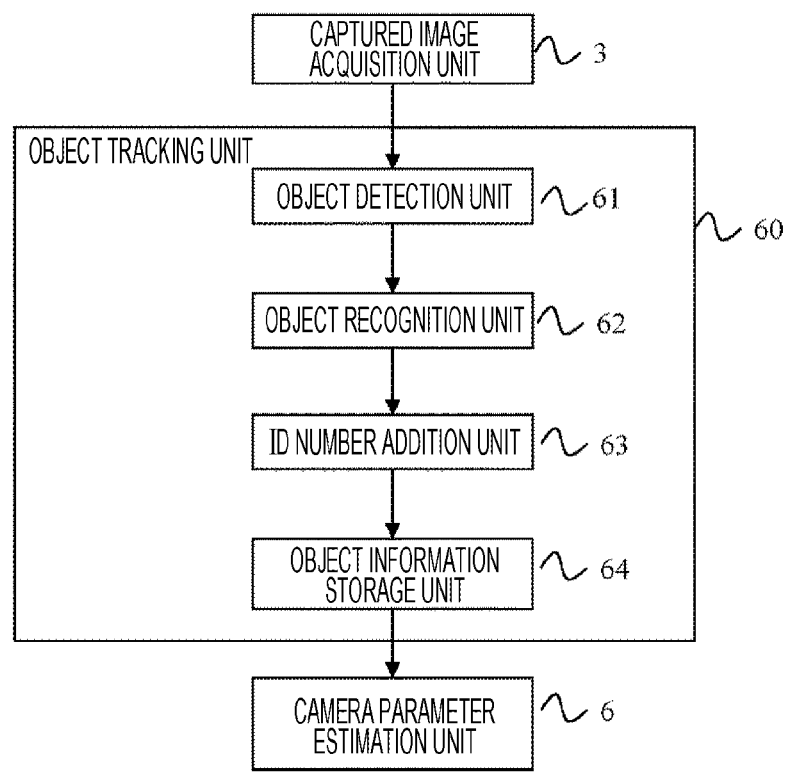
FIG. 13 is a diagram describing a flow of a human tracking unit.

FIG. 13 illustrates the function of the object tracking unit 60 in detail.

In FIG. 13, an object detection unit 61 is a function of detecting a human from captured images, an object recognition unit 62 is a function of determining whether an object detected by the object detection unit 61 is identical to an object detected from captured images in the past, an ID number addition unit 63 is a function of adding an ID number to an object based on the determination result by the object recognition unit 62, and an object information storage unit 64 is a function of storing, for example, image information of a detected object.

The object detection unit 61 is a function of detecting an object from captured images, and the methods include manual detection through, for example, a GUI, and automatic detection with an image feature amount. The latter automatic detection methods with an image feature amount include extraction of an object area based on a difference from a background image photographed in advance, extraction of an area in motion in an image as an object using, for example, an optical flow, and detection through pattern recognition with an HOG feature amount, for example. Methods other than the above are not subjected to any specific limitation, as long as they are methods for detecting an object from images.

The object recognition unit 62 is a function of determining whether an object detected from a current captured image by the object detection unit 61 is identical to one detected from a past captured image. Methods for determining whether objects are identical include facial recognition in a case where the objects are humans, and positional information acquired by, for example, obtaining a difference in movement from a last frame by, for example, an optical flow to consider objects with minimum movement identical. Other methods are also acceptable as long as objects can be determined as identical.

In the ID number addition unit 63, when an object detected in the current captured image by an object detection unit 102 is determined as identical to one in the past by the object recognition unit 62, an ID number identical to one of the object in the past is added, and when not determined as identical, a new ID number is added. In the present embodiment, ID numbers are assumed to be added from zero in ascending order.

In terms of an object $P_n$ detected in the current captured image by the object detection unit 61, the object information storage unit 64 acquires and stores image information of upper and lower bases of the area. Then, in a case where image information of an object $Q_n$ with an ID number identical to one of the object $P_n$ is stored in captured images in the past, characteristic information $O_n$ of "level" is added.

Adoption of the above processing makes it possible to calculate camera parameters in the camera parameter estimation unit 6 as is the case with the first embodiment by outputting image information of upper and lower bases $[(px_n, py_n), (px_{n'}, py_{n'})]$, $[(qx_n, qy_n), (qx_{n'}, qy_{n'})]$, $[(rx_n, ry_n), (rx_{n'}, ry_{n'})] \ldots$ of objects $P_n, Q_n, R_n, \ldots$ that are "level" in characteristic information $O_n$. In the object tracking unit 60, methods other than the above are not subjected to any specific limitation as long as it is possible to track an identical object and obtain two image coordinates on an axis in a height direction on a real space in an object area of the object.

In the third embodiment of the present invention, with the functional configuration described above, calibration can be carried out without inputting coordinate information on a real space by tracking an identical human in camera images.

In the third embodiment, when an identical human in the images can be tracked, a stereo camera, or an imaging device 2 with two cameras is also applicable.

Fourth Embodiment

Figure 14:
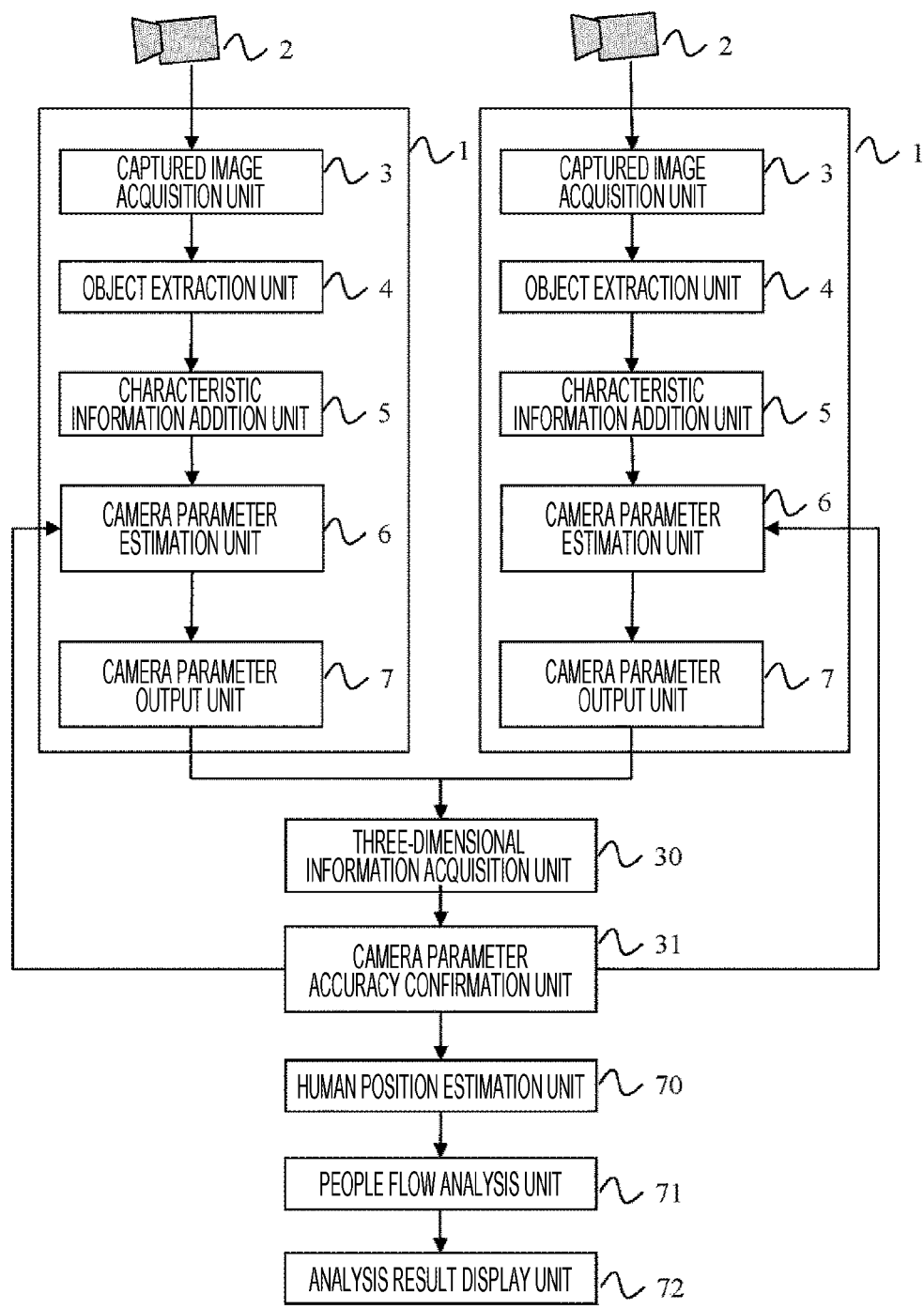
FIG. 14 is a functional bock diagram of a fourth embodiment of the present invention.

A functional block diagram of the fourth embodiment of the present invention will be illustrated in FIG. 14.

In FIG. 14, functions of 1 to 7, 30, and 31 are identical to those in the second embodiment. A human position estimation unit 70 is a function of estimating positions of humans in an image on a real space based on distance information acquired from a distance information acquisition unit 30 and camera parameters adjusted by a camera parameter accuracy confirmation unit 31, a people flow analysis unit 71 is a function of analyzing a people flow such as people counting, traffic line extraction, and congestion hour measurement based on the human positions estimated by the human position estimation unit 70, and an analysis result display unit 72 is a function of displaying results of the people flow analysis conducted by the people flow analysis unit 71 on a PC display, for example. Details of the human position estimation unit 70 and the people flow analysis unit 71 will be described below. Here, an object is assumed to be a human, but may be some other moving object.

FIGS. 15(a) to 15(d) are views for describing a human position estimation unit.

FIG. 15(a) is a captured image with either one of two cameras, with 75a and 75b, 76, and 77 indicating humans, a road, and a building, respectively. In the human position estimation unit 70, firstly, only humans are extracted from a captured image through person detection to create a human area image illustrated in FIG. 15(b). Person detection methods include a method adopted in the person detection unit 61 described in the third embodiment and deriving from a difference from pre-acquired three-dimensional information in a situation without a human. Next, as with the camera parameter accuracy confirmation unit 31, three-dimensional information corresponding to the extracted human area is acquired to generate an overhead image FIG. 15(c), a viewpoint-converted image when the acquired three-dimensional information is viewed from directly above. Lastly, by obtaining a centroid position in each human area in the overhead image FIG. 15(c), it is possible to calculate a human position image FIG. 15(d) and estimate 78a and 78b, positions of humans 75a and 75b on a real space.

FIGS. 16(a) to 16(e) are views for describing the people flow analysis unit 71. FIG. 16(a) is a captured image, FIG. 16(b) is a flow of mapping of estimated human positions on a real space and an actual map, and FIGS. 16(c) to 16(e) illustrate exemplary applications for people flow analysis such as people counting, traffic line extraction, and staying time measurement. In the people flow analysis unit 71, firstly a human position image 79 calculated from the captured image 16(a) by the human position estimation unit 70 is made correspond to a map image 82, actual map information. Methods for this correspondence include manual adjustment of an image coordinate through, for example, a GUI, such that the human positions 78a and 78b displayed on the human position image 79 fall into right places in the map image 80, and are not subjected to any specific limitation. Next, a people flow analysis is made using a mapping image 83 where the human position image 79 and the map image 82 are made correspond to each other. FIG. 16(c) is an example of executing an application for counting the number of humans on the road 76 by comparing image information of the road 76 and image information of human positions 78a and 78b in the mapping image 83. In the present execution example, a human on the road 76 is only 75a, and thus an execution result 84 indicates one. FIG. 16(d) is an example of executing an application for extracting traffic lines tracking humans by combining results of human positions estimated by the human position estimation unit 70 in successive frames. Human tracking methods include a method similar to one in the human tracking unit 60 described in the third embodiment, and tracking by comparing a plurality of human areas in the overhead image in previous and following frames to consider an area with a minimum travel distance as an identical human area, but are not subjected to any specific limitation. In FIG. 16(d), 85a and 85b indicate traffic lines of the humans 75a and 75b, respectively, and it can be recognized that the human 75a moves substantially, while the human 75b remains around an identical place. FIG. 16(e) is an example of executing an application for dividing a map image into four blocks to measure average staying time of a human in each block based on results of traffic line extraction. According to an execution result 86, there is no human in blocks A and C, and thus average staying time is zero second. In block B, there is the human 75a who moves substantially, and in block D, there is the human 76b who stays. Therefore, average staying time is maximum in block D.

In the fourth embodiment of the present invention, with the functional configuration described above, people flow can be analyzed without inputting coordinate information on a real space by estimating human positions based on camera parameters obtained from two cameras and three-dimensional information of objects.

In the fourth embodiment, three-dimensional information of a head part, not of a whole human, may be used.

Figure 17:
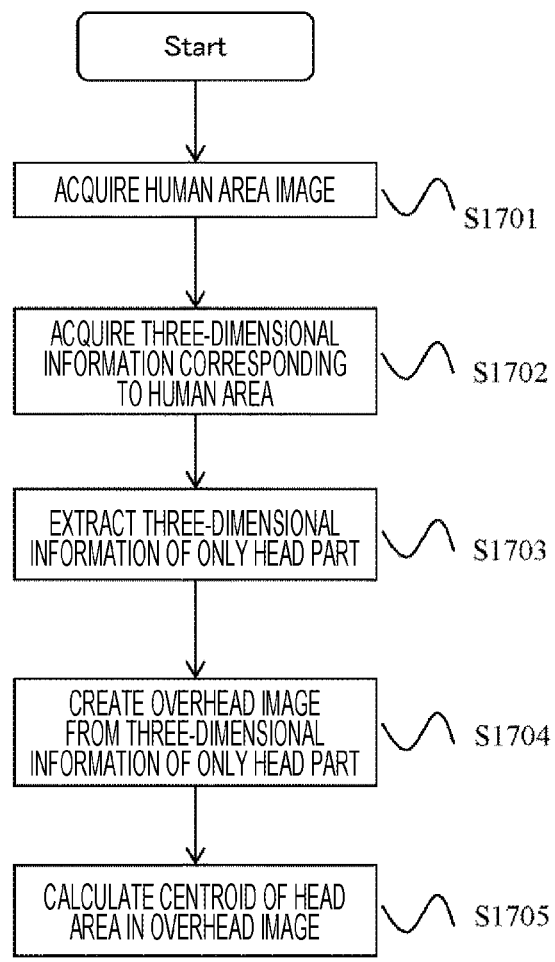
FIG. 17 is a diagram describing a flow of a people flow analysis unit.

FIG. 17 is an exemplary flow of estimation of human positions from a captured image by the human position estimation unit 70.

Firstly, a human area image is created from a captured image through person detection (S1701).

Next, three-dimensional information corresponding to a human area is acquired (S1702), and from the acquired three-dimensional information of a human, three-dimensional information of only a head part thereof is extracted (S1703).

Lastly, an overhead image is created with camera parameters from the extracted three-dimensional information of only a head part (S1704) and a centroid position of each head part in the created overhead image is calculated (S1705), which makes it possible to estimate a human position.

Methods for extracting the three-dimensional information of a head part in S1703 include pre-detecting, for example, a projection shape of a head part with an image feature amount from a captured image to acquire three-dimensional information corresponding to the detected head area, and detecting three-dimensional information at a height above a certain level as a head part using a viewpoint-converted image in the front or side direction created by the camera parameter accuracy confirmation unit 31. Other methods are not subjected to any specific limitation, as long as they are methods for detecting a vicinity of a head part.

Figure 18:
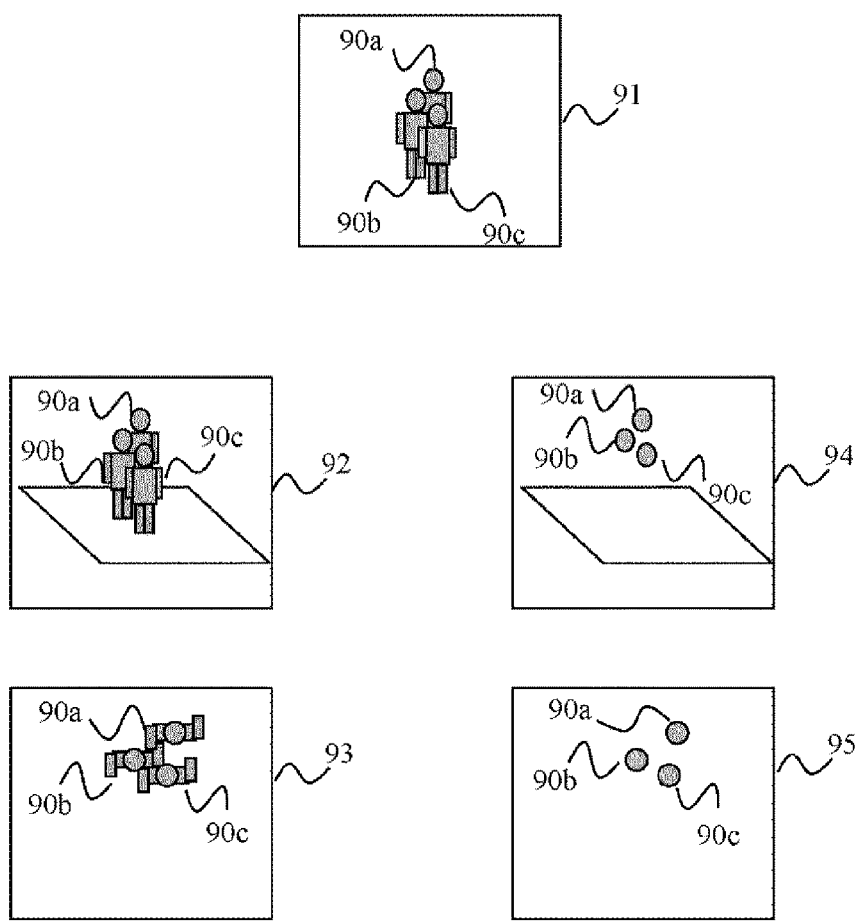
FIG. 18 is a view describing differences between overhead images generated based on three-dimensional information.

FIG. 18 illustrates a difference between results of estimating human positions based on three-dimensional information of whole humans and those based on three-dimensional information of only head parts in accordance with the flow of FIG. 17. In FIG. 18, in a case where an overhead image 93 is created by extracting three-dimensional information 92 of the whole humans from a captured image 91 dense with humans 90a to 90c, there are overlaps in parts such as shoulders, which makes it difficult to distinguish humans and accurately estimate their positions. However, in an overhead image 95 created by extracting three-dimensional information 94 of only face parts of the humans from the captured image 91, there is no overlap. Therefore, positions of the humans 90a to 90c can be accurately estimated.

In the fourth embodiment, in the people flow analysis unit 71, it is acceptable to execute applications other than the people flow analysis application based on the estimated human positions such as people counting, traffic line extraction, and staying time measurement. For example, the applications include a congestion degree estimation application for calculating congestion degree in a specific area as a numerical value by counting the number of humans standing upright in a specific area and measuring staying time for each human, and a behavior recognition application for recognizing a customer service behavior at, for example, shops by determining whether humans move closer to or away from one another depending on coupling conditions of human areas in overhead images and measuring staying time there when the humans move closer to one another.

REFERENCE SIGNS LIST 1 calibration device
2 imaging device
3 image acquisition unit
4 object extraction unit
5 characteristic information addition unit
6 camera parameter estimation unit
7 camera parameter output unit

The invention claimed is:
1. An imaging system, comprising:
a plurality of imaging devices;
a calibration device installed on a management server connected to a network, the calibration device including:
an image acquisition unit which acquires an image from the plurality of imaging devices;
an object extraction unit which extracts a plurality of objects from the image;
a characteristic information addition unit which adds geometry information that indicates geometric relationships among the plurality of objects to each of a set of objects as characteristic information;
a camera parameter estimation unit which obtains image coordinates of the plurality of objects in accordance with the characteristic information to estimate camera parameters of the plurality of imaging devices based on the characteristic information and the image coordinates, the camera parameter estimation unit including:
an object information acquisition unit which inputs the characteristic information output from the characteristic information addition unit and obtains the image coordinates;

an initial parameter acquisition unit which acquires an initial value of each of the estimated camera parameters; and a parameter calculation unit which calculates a final camera parameter from the initial value of each of the estimated camera parameters based on the characteristic information added to the each of the plurality of objects from the image and the image coordinates;

a camera parameter output unit which outputs the estimated camera parameters estimated in the camera parameter estimation unit; and a three-dimensional information acquisition unit which acquires three-dimensional information of the plurality of objects in the image and the estimated camera parameters obtained from the camera parameter output unit;

an interface which displays the three-dimensional information of the plurality of objects and a plurality of viewpoint-converted images comprising the three-dimensional information viewed from different viewpoints based on the estimated camera parameters, the interface including:

a parameter adjustment unit configured to receive a change in a value of one or more estimated camera parameters; and a camera parameter accuracy confirmation unit configured to confirm an accuracy of the estimated camera parameters from the three-dimensional information of the plurality of objects acquired by the three-dimensional information acquisition unit and re-estimate the estimated camera parameters;

wherein a user can adjust the value of the estimated parameters when necessary by viewing the plurality of viewpoint-converted images displayed in the interface;

wherein the viewpoint-converted images are created from the three-dimensional information; and wherein the user can re-input an adjusted camera parameter value again from the camera parameter accuracy confirmation unit into the camera parameter estimation unit to acquire a more accurate camera parameter.

2. The imaging system according to claim 1, wherein, in a case where the characteristic information is vertical, the camera parameter output unit obtains, among the plurality of objects, for one configuring a horizontal plane on a real space, two arbitrary image coordinates of the object, and among the plurality of objects, for one vertical to a horizontal plane on a real space, two image coordinates on an axis in a height direction on a real space in an object area of the object.

3. The imaging system according to claim 1, wherein, in a case where the characteristic information is level, the camera parameter output unit obtains, among the plurality of objects, for one vertical to a horizontal plane on a real space, two image coordinates on an axis in a height direction on a real space in an object area.

4. The imaging system according to claim 1, wherein the interface is capable of displaying the image, selecting the plurality of objects, and adding characteristic information to the each arbitrary set of objects among the plurality of objects.

5. The imaging system according to claim 1, wherein the object extraction unit carries out scene recognition of the image, detects a plurality of objects from the image based on results of the scene recognition, and adds the characteristic information.

6. An imaging system, comprising:
a plurality of imaging devices;
a calibration device installed on a management server connected to a network, the calibration device including:
an image acquisition unit which acquires an image from the plurality of imaging devices;
an object tracking unit which acquires characteristic information of a plurality of objects and image information of the image, the object tracking unit including:
an object detection unit which detects an object from the image;
an object recognition unit which determines whether a first object detected at a first time and a second object detected at a second time are identical;
an ID number addition unit which adds an ID number to the object from the image based upon a determination result by the object recognition unit; and
an object information storage unit which acquires, in a case where the first object detected at the first time and the second object detected at the second time are identical, information on height of the objects on images at the first and second times and adds geometry information that indicates a geometric relationship established between the first and second objects as characteristic information to each set of objects;
a camera parameter estimation unit which estimates camera parameters of the plurality of imaging devices based on the characteristic information and the image coordinates, the camera parameter estimation unit including:
an object information acquisition unit which inputs the characteristic information output from the characteristic information addition unit and obtains an image coordinate;
an initial parameter acquisition unit which acquires an initial value of each of the estimated camera parameters; and
a parameter calculation unit which calculates a final camera parameter from the initial value of each of the estimated camera parameters based on the characteristic information added to the each of the plurality of objects from the image and the image coordinates;
a camera parameter output unit which outputs the estimated camera parameters estimated in the camera parameter estimation unit; and
a three-dimensional information acquisition unit which acquires three-dimensional information of the plurality of objects in the image and the estimated camera parameters obtained from the camera parameter output unit:
an interface which displays the three-dimensional information of the plurality of objects and a plurality of viewpoint-converted images comprising the three-dimensional information viewed from different viewpoints based on the estimated camera parameters, the interface including:
a parameter adjustment unit configured to receive a change in a value of one or more estimated camera parameters; and
a camera parameter accuracy confirmation unit configured to confirm an accuracy of the estimated camera parameters from the three-dimensional information of the plurality of objects acquired by the three-dimensional information acquisition unit and re-estimate the estimated camera parameters;

wherein a user can adjust the value of the estimated parameters when necessary by viewing the plurality of viewpoint-converted images displayed in the interface;

wherein the viewpoint-converted images are created from the three-dimensional information; and wherein the user can re-input an adjusted camera parameter value again from the camera parameter accuracy confirmation unit into the camera parameter estimation unit to acquire a more accurate camera parameter.

7. The imaging system according to claim 1, wherein the interface adjusts each of the plurality of viewpoint-converted images once the value of one or more camera parameters are changed.

8. The imaging system according to claim 7, wherein the object extraction unit detects an object using each of the plurality of viewpoint-converted images.

9. The imaging system according to claim 6, wherein the interface changes each of the plurality of viewpoint-converted images once the value of the one or more estimated camera parameters is changed.

10. The imaging system according to claim 9, wherein the object tracking unit detects an object using each of the plurality of viewpoint-converted images.

* * * * *